United States Patent
Luomi et al.

(10) Patent No.: US 11,553,448 B2
(45) Date of Patent: Jan. 10, 2023

(54) METHOD AND APPARATUS FOR RESTRICTING USE OF A BEAMFORMING NODE FOR POSITIONING PURPOSES

(71) Applicant: HERE Global B.V., Eindhoven (NL)

(72) Inventors: Marko Luomi, Lempäälä (FI); Lauri Aarne Johannes Wirola, Tampere (FI); Petri Rauhala, Tampere (FI)

(73) Assignee: HERE GLOBAL B.V., Eindhoven (NL)

(*) Notice: Subject to any disclaimer, the term of this patent is extended or adjusted under 35 U.S.C. 154(b) by 0 days.

(21) Appl. No.: 17/116,798

(22) Filed: Dec. 9, 2020

(65) Prior Publication Data
US 2021/0400617 A1 Dec. 23, 2021

Related U.S. Application Data

(60) Provisional application No. 63/042,205, filed on Jun. 22, 2020.

(51) Int. Cl.
*H04W 64/00* (2009.01)
*H04W 16/28* (2009.01)

(52) U.S. Cl.
CPC ......... *H04W 64/003* (2013.01); *H04W 16/28* (2013.01)

(58) Field of Classification Search
CPC .... H04W 64/003; H04W 16/28; H04W 64/00
See application file for complete search history.

(56) References Cited

U.S. PATENT DOCUMENTS

| 8,244,272 | B2 | 8/2012 | Morgan et al. |
| 8,559,974 | B2 | 10/2013 | Alizadeh-Shabdiz et al. |
| 9,451,485 | B2 | 9/2016 | Sydir et al. |
| 9,913,092 | B2* | 3/2018 | Chan ............... H04W 4/023 |
| 2014/0248906 | A1* | 9/2014 | Wigren ............ H04W 4/02 455/456.1 |
| 2015/0119031 | A1* | 4/2015 | Brownworth ....... H04W 60/005 455/435.1 |
| 2017/0070854 | A1* | 3/2017 | Poola et al. |

(Continued)

FOREIGN PATENT DOCUMENTS

WO WO 2018/002154 A1 1/2018

OTHER PUBLICATIONS

Cheng et al., *Localization in Inconsistent WIFI Environments*, Dept Computer Science and Engineering, Texas A&M Univ (16 pages).

(Continued)

*Primary Examiner* — Kenneth T Lam
(74) *Attorney, Agent, or Firm* — Alston & Bird LLP (57) ABSTRACT

A method, apparatus and computer program product are provided to identify a particular wireless communication node of one or more wireless communication nodes as a beamforming node. The method, apparatus and computer program product also restrict use of the particular wireless communication node for positioning purposes relative to another one of the wireless communication nodes that has not been identified as a beamforming node. In relation to restricting the use of a beamforming node for positioning purpose, the use of a beamforming node may be restricted in relation to the generation or updating of a radio map and/or in relation to the determination of a position of a mobile device.

20 Claims, 3 Drawing Sheets

---

30 — Identifying a particular wireless communication node of one or more wireless communication nodes as a beamforming node 32 — Restricting use of the particular wireless communication node for positioning purposes relative to another one of the wireless communication nodes that has not been identified as a beamforming node (56) References Cited

U.S. PATENT DOCUMENTS

| | | | |
|---|---|---|---|
| 2017/0331670 A1* | 11/2017 | Parkvall | H04J 11/0079 |
| 2018/0027519 A1* | 1/2018 | Lee | H04W 16/28 |
| | | | 455/456.1 |
| 2019/0305875 A1 | 10/2019 | Xue | |
| 2020/0053740 A1* | 2/2020 | Wigren | H04W 64/006 |
| 2020/0145977 A1 | 5/2020 | Kumar et al. | |
| 2020/0241106 A1* | 7/2020 | Shu | G01S 5/0252 |
| 2020/0396710 A1* | 12/2020 | Wigren | H04W 64/00 |

OTHER PUBLICATIONS

Li et al., *Forward-backward generalized sidelobe canceler beamforming applied to medical ultrasound imaging*, AIP Advances 7, 015201 (2017): https://doi.org/10.1063/1.4974247, Published Jan. 12, 2017.

Extended European Search Report for European Application No. 21190806.8 dated Dec. 9, 2021, 8 pages.

\* cited by examiner

METHOD AND APPARATUS FOR RESTRICTING USE OF A BEAMFORMING NODE FOR POSITIONING PURPOSES

CROSS REFERENCE TO RELATED APPLICATION

This application claims benefit of U.S. Provisional Application No. 63/042,205, filed Jun. 22, 2020, which is incorporated herein by reference in its entirety.

TECHNOLOGICAL FIELD

A method, apparatus and computer program product are provided in accordance with an example embodiment in order to identify a beamforming node and, more particularly, to restrict the use of a beamforming node for positioning purposes relative to other wireless communication nodes that have not been identified as beamforming nodes.

BACKGROUND

Various positioning systems have been developed for determining the position of a mobile device, such as a smart phone or other type of user equipment. At least some of these positioning systems utilize models of wireless communication nodes that, in turn, are based on radio fingerprints that have been received by a plurality of mobile devices. The wireless communication nodes may be part of a cellular system, such as a Global System for Mobile communications (GSM) system, a wideband code division multiple access (WCDMA) system, a time division synchronous code division system multiple access (TD-SCDMA) system, a Long Term Evolution (LTE) system, a Long Term Evolution Advanced (LTE-A) system, a code division multiple access (CDMA) system, etc. or a non-cellular system, such as a Wireless Local Area Network (WLAN) system, a Bluetooth (BT) system, a Bluetooth Low Energy (BTLE) system or a Zigbee system.

In relation to the models of wireless communication nodes that are utilized by positioning systems, databases containing information regarding the radio signals received by mobile devices at different locations from the wireless communication nodes are created. The databases are typically formed of data provided by the mobile devices in the form of radio fingerprints. Each radio fingerprint includes an estimate of the location of the mobile device at the time at which the radio signals were captured and a measurement of the radio signals that were captured. With respect to cellular signals, the measurement of the cellular signals may include an identification of the cellular network cell, e.g., base station, that is transmitting the cellular signals that are received by the mobile device, such as a global and/or local identifier (ID) of the cellular network cell. The measurement of the cellular signals may also include a measurement of the signal strength and/or an estimate of the path loss as well as a timing measurement, such as a Timing Advance measurement or a Round-Trip Time measurement. With respect to the measurement of a non-cellular signal, the measurement may include an identification of the access point generating the non-cellular signals that are received by the mobile device, such as the basic service set identifiers (BSSIDs), e.g., a media access control (MAC) address of the air interface of an access point, e.g., a WLAN access point, or the service set identifier (SSID) or network name of the access point, e.g., WLAN access point. The measurement of a non-cellular signal also includes a measure of the signal strength, such as the received signal strength, the Rx level, etc. and/or a path loss estimate. In some embodiments, the measurement of a non-cellular signal also includes a timing measurement, such as the Round-Trip Time measurement.

The data, such as the radio fingerprints, collected by the plurality of mobile devices is generally uploaded, such as to a server or the cloud. By reference to the data, the positioning system then generates or updates a model of the wireless communication nodes and, more particularly, the radio signals transmitted by the wireless communication nodes that are received by mobile devices at different respective locations, such as based upon one or more algorithms. The model may then be utilized for positioning purposes, that is, to determine the location of a mobile device based upon radio signals received by the mobile device at the respective location. Various models may be constructed including models based upon the coverage areas of the wireless communication nodes, models based upon the positions of the wireless communication nodes, radio propagation models, models based upon the Rx fields of the wireless communications nodes or the like. The resulting models may be stored by one or more network entities, such as by the positioning system, and/or may be transferred to one or more of the mobile devices.

The models may then be utilized to determine the position of a mobile device. For example, a mobile device may subsequently capture measurements of the cellular or non-cellular signals at an unknown location. By reference to the model that has been constructed, the measurements of the radio signals may be evaluated and the location of the mobile terminal may be determined.

Figure 1:
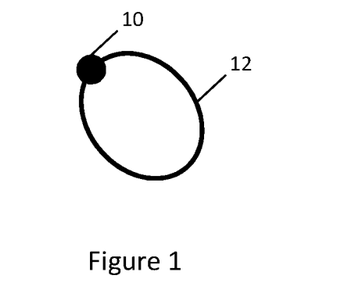
FIG. 1 illustrates a fixed coverage model of a wireless communication node.

Traditionally, the cellular network cells, such as the base stations, of a cellular network and the access points of a non-cellular network have a fixed coverage model. As shown in FIG. 1, a fixed coverage model of a wireless communication node, such as a cellular network cell or a non-cellular access point, has a transmission power level distribution that is stable and static. In this regard, FIG. 1 depicts a wireless communication node 10 having a signal antenna element transmitting in a fixed direction. Since the transmission power level distribution is stable, the resulting coverage model 12 of the wireless communication node is depicted to be relatively static with the measured transmission power level around the wireless communication node not varying over time.

However, some radio technologies, such as fifth generation (5G) cellular networks and 802.11ac non-cellular networks, support beamforming. Beamforming is a technique that utilizes an array of antennas, such as phase-controlled antennas, that are controlled to individually transmit radio signals in a respective direction. Rather than transmitting radio signals in all directions, a beamforming node is configured to initially determine a direction of interest, such as the direction of a mobile device relative to the beamforming node, and then to control the array of antennas so as to send and receive a stronger beam of radio signals in the direction of interest than in other directions. Alternatively, a beamforming node may sequentially transmit radio signals by each of the antennas of the phased array such that radio signals are preferentially transmitted and received in different directions in a predefined sequence. As the direction in which a stronger beam of radio signals is transmitted and received may vary over time, the resulting coverage model of the beamforming node is dynamic. In other words, at different times, the power level of the radio signals transmitted by a beamforming node that are received and measured at a particular location relative to the beamforming node can vary significantly.

Figure 2A:
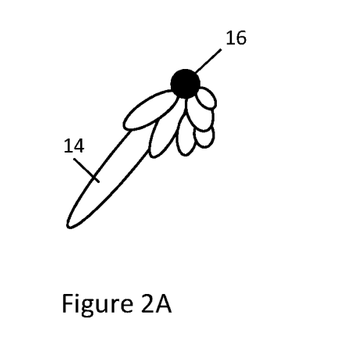
FIGS. 2A and 2B illustrate the coverage models of a beamforming node at two different points in time.
Figure 2B:
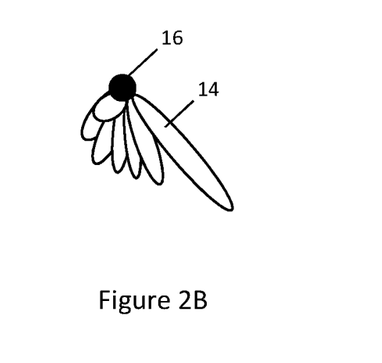

By way of example, FIG. 2A depicts the coverage model 14 of a beamforming node 16 at one point in time, while FIG. 2B depicts the coverage model of the same beamforming node at a different point in time. As illustrated, the coverage models of the same beamforming node differ with the radio signals being preferentially transmitted and received by different antennas of the phased array at different points in time.

The dynamic nature of the coverage model of a beamforming node creates challenges with respect to the generation of a radio model that is based upon radio fingerprints collected by mobile devices at different points in time based upon the radio signals transmitted by the beamforming node. In this regard, the radio fingerprints collected by a mobile device at the same location relative to a beamforming mode may be different at different points in time because of the changes in the coverage model of the beamforming node. Thus, the accuracy and reliability of the resulting radio model may be reduced in instances in which the wireless communication nodes include one or more beamforming nodes due to the changing nature of the coverage model of a beamforming node. Similarly, the location of a beamforming node that is estimated based on the radio fingerprints including the signal strength values of the radio signals transmitted by the beamforming node is also less accurate due to the dynamic nature of the coverage model relative to a wireless communication node having a static coverage model.

BRIEF SUMMARY

A method, apparatus and computer program product are provided in accordance with an example embodiment in order to identify a beamforming node and to restrict the use of the beamforming node for positioning purposes relative to one or more other wireless communication nodes that are not identified as a beamforming node. In this regard, the method, apparatus and computer program product of an example embodiment may restrict the use of a beamforming node in relation to the generation or updating of a radio map. In another example embodiment, the method, apparatus and computer program product may restrict the use of a beamforming node in relation to the determination of a position of a mobile device. As such, the method, apparatus and computer program product of an example embodiment can increase the accuracy and/or confidence with which a radio model is generated or updated and/or the position of mobile device is determined by identifying and restricting the use of a beamforming node for positioning purposes.

In an example embodiment, an apparatus is provided that includes processing circuitry and at least one non-transitory memory including computer program code instructions with the computer program code instructions configured to, when executed, cause the apparatus to at least identify a particular wireless communication node of one or more wireless communication nodes as a beamforming node. The computer program code instructions are also configured to cause the apparatus to restrict use of the particular wireless communication node for positioning purposes relative to another one of the wireless communication nodes that has not been identified as a beamforming node.

The computer program code instructions that are configured to restrict use of the particular wireless communication node for positioning purposes in accordance with an example embodiment include computer program code instructions configured to cause an indication to be transmitted to a positioning system regarding the particular wireless communication node being a beamforming node. In this example embodiment, the computer program code instructions configured to cause the indication to be transmitted to the positioning system may include computer program code instructions configured to cause information regarding the particular wireless communication node to be transmitted to the positioning system. In another example embodiment, the computer program code instructions configured to restrict use of the particular wireless communication node for positioning purposes include computer program code instructions configured, prior to causing fingerprint information to be provided to a positioning system, (i) to exclude information regarding the particular wireless communication node from the fingerprint information based on the particular wireless communication node having been identified as a beamforming node, and (ii) to include information regarding another one of the wireless communication nodes that has not been identified as a beamforming node. The computer program code instructions are further configured to, when executed, cause the apparatus of this example embodiment to provide the information regarding the another one of the wireless communication nodes that has not been identified as a beamforming node to the positioning system.

The computer program code instructions configured to identify the particular wireless communication node as a beamforming node in accordance with an example embodiment include computer program code instructions configured to determine a measure of the signals received from the one or more wireless communication nodes and to identify, from the measure of the signals received from the one or more wireless communication nodes, that two or more different beams are received from the particular wireless communication nodes that is identified as a beamforming node. In an alternative embodiment, the computer program code instructions configured to identify the particular wireless communication node as a beamforming node include computer program code instructions configured to receive an indication that the particular wireless communication node was identified to be a beamforming node.

The computer program code instructions configured to restrict use of the particular wireless communication node for positioning purposes in accordance with an example embodiment include computer program code instructions configured to generate or update a radio map without reliance upon the particular wireless communication node that was identified to be a beamforming node. Additionally or alternatively, the computer program code instructions configured to restrict use of the particular wireless communication node for positioning purposes may include computer program code instructions configured to determine a position of a mobile device without reliance upon the particular wireless communication node that was identified to be a beamforming node. In an example embodiment, the computer program code instructions configured to restrict use of the particular wireless communication node for positioning purposes include computer program code instructions configured to construct or update a coverage model so as to rely upon the particular wireless communication node for positioning purposes to a lesser degree than the another one of the wireless communication nodes that has not been identified as a beamforming node. In this example embodiment, the computer program code instructions configured to construct or update the coverage model may include computer program code instructions configured to differently weight a contribution of the particular wireless communication node for positioning purposes than the contribution by the another one of the wireless communication nodes that has not been identified as a beamforming node.

In another example embodiment, a method is provided that includes identifying a particular wireless communication node of one or more wireless communication nodes as a beamforming node. The method also includes restricting use of the particular wireless communication node for positioning purposes relative to another one of the wireless communication nodes that has not been identified as a beamforming node.

The method of an example embodiment restricts use of the particular wireless communication node for positioning purposes by causing an indication to be transmitted to a positioning system regarding the particular wireless communication node being a beamforming node. In this example embodiment, the method also includes causing information regarding the particular wireless communication node to be transmitted to the positioning system. In another example embodiment, the method restricts use of the particular wireless communication node for positioning purposes by, prior to causing fingerprint information to be provided to a positioning system, (i) excluding information regarding the particular wireless communication node from the fingerprint information based on the particular wireless communication node having been identified as a beamforming node, and (ii) including information regarding another one of the wireless communication nodes that has not been identified as a beamforming node. The method of this example embodiment also includes providing the information regarding the another one of the wireless communication nodes that has not been identified as a beamforming node to the positioning system.

The method of an example embodiment identifies the particular wireless communication node as a beamforming node by determining a measure of the signals received from the one or more wireless communication nodes and identifying, from the measure of the signals received from the one or more wireless communication nodes, that two or more different beams are received from the particular wireless communication nodes that is identified as a beamforming node. In an alternative embodiment, the method identifies the particular wireless communication node as a beamforming node by receiving an indication that the particular wireless communication node was identified to be a beamforming node.

The method of an example embodiment restricts use of the particular wireless communication node for positioning purposes by generating or updating a radio map without reliance upon the particular wireless communication node that was identified to be a beamforming node. Additionally or alternatively, the method may restrict use of the particular wireless communication node for positioning purposes by determining a position of a mobile device without reliance upon the particular wireless communication node that was identified to be a beamforming node. In an example embodiment, the method restricts use of the particular wireless communication node for positioning purposes by constructing or updating a coverage model so as to rely upon the particular wireless communication node for positioning purposes to a lesser degree than the another one of the wireless communication nodes that has not been identified as a beamforming node. In this example embodiment, the method may construct or update the coverage model by differently weighting a contribution of the particular wireless communication node for positioning purposes than the contribution by the another one of the wireless communication nodes that has not been identified as a beamforming node.

In a further example embodiment, a computer program product is provided that includes a non-transitory computer readable medium having program code portions stored thereon with the program code portions being configured, upon execution, to at least identify a particular wireless communication node of one or more wireless communication nodes as a beamforming node. The program code portions are also configured, upon execution, to restrict use of the particular wireless communication node for positioning purposes relative to another one of the wireless communication nodes that has not been identified as a beamforming node.

The program code portions that are configured to restrict use of the particular wireless communication node for positioning purposes in accordance with an example embodiment include program code portions configured to cause an indication to be transmitted to a positioning system regarding the particular wireless communication node being a beamforming node. In this example embodiment, the program code portions configured to cause the indication to be transmitted to the positioning system may include program code portions configured to cause information regarding the particular wireless communication node to be transmitted to the positioning system. In another example embodiment, the program code portions configured to restrict use of the particular wireless communication node for positioning purposes include program code portions configured, prior to causing fingerprint information to be provided to a positioning system, (i) to exclude information regarding the particular wireless communication node from the fingerprint information based on the particular wireless communication node having been identified as a beamforming node, and (ii) to include information regarding another one of the wireless communication nodes that has not been identified as a beamforming node. The program code portions are further configured, when executed, to provide the information regarding the another one of the wireless communication nodes that has not been identified as a beamforming node to the positioning system.

The program code portions configured to identify the particular wireless communication node as a beamforming node in accordance with an example embodiment include program code portions configured to determine a measure of the signals received from the one or more wireless communication nodes and program code portions configured to identify, from the measure of the signals received from the one or more wireless communication nodes, that two or more different beams are received from the particular wireless communication nodes that is identified as a beamforming node. In an alternative embodiment, the program code portions configured to identify the particular wireless communication node as a beamforming node include program code portions configured to receive an indication that the particular wireless communication node was identified to be a beamforming node.

The program code portions configured to restrict use of the particular wireless communication node for positioning purposes in accordance with an example embodiment include program code portions configured to generate or update a radio map without reliance upon the particular wireless communication node that was identified to be a beamforming node. Additionally or alternatively, the program code portions configured to restrict use of the particular wireless communication node for positioning purposes may include program code portions configured to determine a position of a mobile device without reliance upon the particular wireless communication node that was identified to be a beamforming node. In an example embodiment, the program code portions configured to restrict use of the particular wireless communication node for positioning purposes include program code portions configured to construct or update a coverage model so as to rely upon the particular wireless communication node for positioning purposes to a lesser degree than the another one of the wireless communication nodes that has not been identified as a beamforming node. In this example embodiment, the program code portions configured to construct or update the coverage model may include program code portions configured to differently weight a contribution of the particular wireless communication node for positioning purposes than the contribution by the another one of the wireless communication nodes that has not been identified as a beamforming node.

In yet another example embodiment, an apparatus is provided that includes means for identifying a particular wireless communication node of one or more wireless communication nodes as a beamforming node. The apparatus also includes means for restricting use of the particular wireless communication node for positioning purposes relative to another one of the wireless communication nodes that has not been identified as a beamforming node.

The means for restricting use of the particular wireless communication node for positioning purposes in accordance with an example embodiment include means for causing an indication to be transmitted to a positioning system regarding the particular wireless communication node being a beamforming node. In this example embodiment, the means for causing the indication to be transmitted to the positioning system may include means for causing information regarding the particular wireless communication node to be transmitted to the positioning system. In another example embodiment, the means for restricting use of the particular wireless communication node for positioning purposes include means for causing fingerprint information to be provided to a positioning system, (i) to exclude information regarding the particular wireless communication node from the fingerprint information based on the particular wireless communication node having been identified as a beamforming node, and (ii) to include information regarding another one of the wireless communication nodes that has not been identified as a beamforming node. The apparatus of this example embodiment further includes means for providing the information regarding the another one of the wireless communication nodes that has not been identified as a beamforming node to the positioning system.

The means for identifying the particular wireless communication node as a beamforming node in accordance with an example embodiment include means for determining a measure of the signals received from the one or more wireless communication nodes and means for identifying, from the measure of the signals received from the one or more wireless communication nodes, that two or more different beams are received from the particular wireless communication nodes that is identified as a beamforming node. In an alternative embodiment, the means for identifying the particular wireless communication node as a beamforming node include means for receiving an indication that the particular wireless communication node was identified to be a beamforming node.

The means for restricting use of the particular wireless communication node for positioning purposes in accordance with an example embodiment include means for generating or updating a radio map without reliance upon the particular wireless communication node that was identified to be a beamforming node. Additionally or alternatively, the means for restricting use of the particular wireless communication node for positioning purposes may include means for determining a position of a mobile device without reliance upon the particular wireless communication node that was identified to be a beamforming node. In an example embodiment, the means for restricting use of the particular wireless communication node for positioning purposes include means for constructing or updating a coverage model so as to rely upon the particular wireless communication node for positioning purposes to a lesser degree than the another one of the wireless communication nodes that has not been identified as a beamforming node. In this example embodiment, the means for constructing or updating the coverage model may include means for differently weighting a contribution of the particular wireless communication node for positioning purposes than the contribution by the another one of the wireless communication nodes that has not been identified as a beamforming node.

BRIEF DESCRIPTION OF THE DRAWINGS

Having thus described certain embodiments of the present disclosure in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to identify a wireless communication node that is configured to transmit radio signals having a coverage model that changes over time and to restrict the use of such a wireless communication node that has a variable coverage model for positioning purposes. Although described below in conjunction with a beamforming node having a coverage model that changes over time, other types of wireless communication nodes that have a dynamic coverage model may be identified and use of such wireless communication nodes may be restricted for positioning purposes.

In an example embodiment, however, a method, apparatus and computer program product are provided to identify a wireless communication node that is a beamforming node and to restrict the use of the beamforming node for positioning purposes. In this regard, the use of a beamforming node may be restricted for positioning purpose in conjunction with the generation and/or updating of a radio map. Additionally or alternatively, the use of a beamforming node may be restricted for purposes of determining the position of a mobile device. By identifying a beamforming node and restricting the use of the beamforming node for positioning purposes, the method, apparatus and computer program product of an example embodiment increase the confidence in the radio map that is created or updated and/or in the position of a mobile device that is determined by a eliminating or reducing reliance upon radio signals generated by a beamforming node that vary over time.

The apparatus configured to identify a beamforming node and to restrict the use of the beamforming node for positioning purposes in accordance with an example embodiment may be embodied by any of a variety of computing devices. For example, the apparatus may be embodied by a mobile device that receives the radio signals from a plurality of wireless communication nodes including from at least one beamforming node. In this regard, a mobile device may include any of a wide variety of mobile terminals such as a mobile telephone, a smart phone, a personal digital assistant (PDA), a personal navigation device, a smart watch, a tablet computer, or any combination of the aforementioned and other types of portable computer devices. Alternatively, the apparatus may be embodied by a positioning system, such as by a server or other computing device of a positioning system, that receives information from one or more mobile devices regarding the radio signals captured by the one or more mobile devices in order to, for example, create or update a radio map and/or to determine the location of the mobile device. Still further, the apparatus of another example embodiment may be embodied by another network entity, such as a server, a computer workstation, a distributed network of computing devices, a personal computer or any other type of computing device, that is distinct from both a positioning system and the mobile devices, but that is in communication, either directly or indirectly, with the positioning system and the one or more mobile devices. Still further, the apparatus may be embodied by distributed network of computing devices, such as a combination of the computing devices embodied by one or more mobile devices, the positioning system and/or one or more other network entities.

Figure 3:
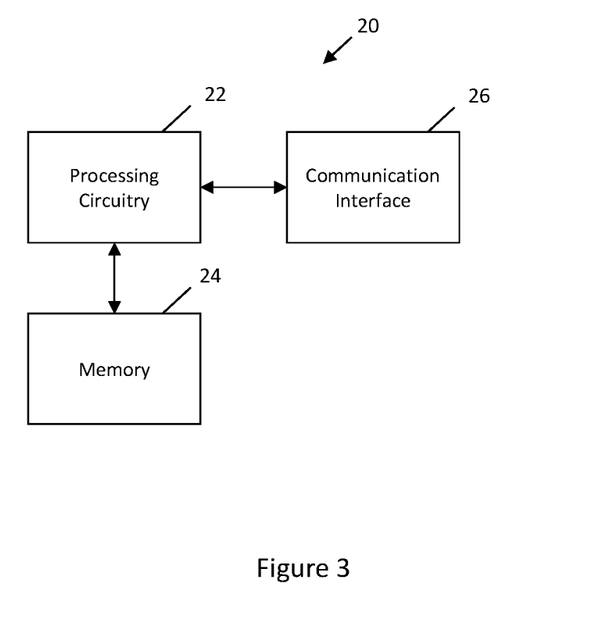
FIG. 3 is a block diagram of an apparatus that may be specifically configured in accordance with an example embodiment in order to identify and restrict the use of a beamforming node for positioning purposes.

Regardless of the manner in which the apparatus is embodied, the apparatus 20 of an example embodiment includes, is associated with or is otherwise in communication with processing circuitry 22, a memory 24 and a communication interface 26, such as shown in FIG. 3. In some embodiments, the processing circuitry (and/or coprocessors or any other processors assisting or otherwise associated with the processing circuitry) can be in communication with the memory via a bus for passing information among components of the apparatus. The memory can be non-transitory and can include, for example, one or more volatile and/or non-volatile memories. In other words, for example, the memory may be an electronic storage device (for example, a computer readable storage medium) comprising gates configured to store data (for example, bits) that can be retrievable by a machine (for example, a computing device like the processing circuitry). The memory can be configured to store information, data, content, applications, instructions, or the like for enabling the apparatus to carry out various functions in accordance with an example embodiment of the present disclosure. For example, the memory can be configured to buffer input data for processing by the processing circuitry. Additionally or alternatively, the memory can be configured to store instructions for execution by the processing circuitry.

The processing circuitry 22 can be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry can include one or more processing cores configured to perform independently. Additionally or alternatively, the processing circuitry can include one or more processors configured in tandem via the bus.

In an example embodiment, the processing circuitry 22 can be configured to execute instructions stored in the memory 24 or otherwise accessible to the processing circuitry. Alternatively or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, a mobile device, a server or other computing device of a positioning system or other network entity) configured to employ an embodiment of the present disclosure by further configuration of the processor by instructions for performing the algorithms and/or operations described herein. The processing circuitry can include, among other things, a clock, an arithmetic logic unit (ALU) and/or one or more logic gates configured to support operation of the processing circuitry.

The apparatus 20 of an example embodiment can also include the communication interface 26 that can be any means such as a device or circuitry embodied in either hardware or a combination of hardware and software that is configured to receive and/or transmit data from/to other electronic devices in communication with the apparatus, such as a database which, in one embodiment, stores a radio map generated and/or employed by the processing circuitry 22. The communication interface may be configured to support communication, for example, between one or more mobile devices, a positioning system and/or one or more other network entities. In an embodiment in which the apparatus is embodied by a mobile device, the communication interface may also be configured to communicate in accordance with various wireless protocols including communication with one or more wireless communication nodes of a cellular system and/or a non-cellular system. The communication interface can include, for example, an antenna (or multiple antennas) and supporting hardware and/or software for enabling communications with a wireless communication network. In this regard, the communication interface can include, for example, an antenna (or multiple antennas) and supporting hardware and/or software for enabling communications with a wireless communication network. Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication.

Figure 4:
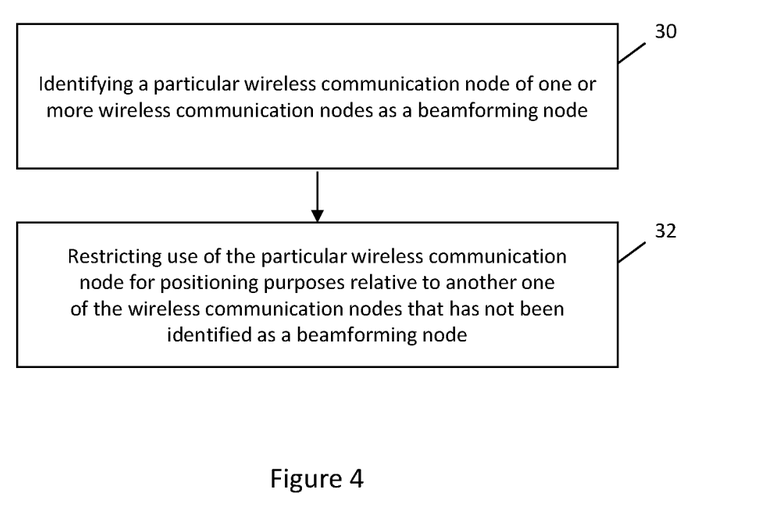
FIG. 4 is a flowchart illustrating the operations performed, such as by the apparatus of FIG. 3, in accordance with an example embodiment.

Referring now to FIG. 4, the operations performed, such as by the apparatus 20 of FIG. 3, are depicted. As shown of block 30 of FIG. 4, the apparatus includes means, such as processing circuitry 22 or the like, for identifying a particular wireless communication node of one or more wireless communication nodes, such as one or more base stations or other cellular nodes and/or one or more access points or other non-cellular nodes, as a beamforming node. The apparatus, such as the processing circuitry, may be configured to identify a wireless communication node as a beamforming node in various manners. In one embodiment, the apparatus includes means, such as the processing circuitry, the communication interface 26 or the like, for determining a measure of the signals received from the one or more wireless communication nodes. For example, the apparatus may be embodied by a mobile device and be configured to receive signals from one or more wireless communication nodes. Separately for each wireless communication node with which the apparatus is in communication, the apparatus of this example embodiment includes means, such as the processing circuitry, the communication interface or the like, for determining the received signal strength or other measure of the signals received from the respective wireless communication nodes.

In an example embodiment, the apparatus 20, such as the processing circuitry 22, the communication interface 26 or the like, is configured to determine the measure, e.g., the received signal strength, of the signals received from a respective wireless communication node at each of a plurality of different points in time. As a result, the apparatus of this example embodiment may also include means, such as the processing circuitry, the communication interface or the like, for identifying, from the measure of the signals received from the one or more wireless communication nodes, that two or more different beams of radio signals are received, such as at different points in time, from the particular wireless communication node that is identified as a beamforming node. Separately for the different wireless communication nodes with which the apparatus, such as the communication interface, is in communication, the apparatus, such as the processing circuitry, communication interface or the like, of this example embodiment is configured to measure the radio signals received from a respective wireless communication device at two or more different times and to identify, based upon the measurements at two or more different times, whether different beams of radio signals are received from the same respective wireless communication node. In an instance in which two or more different beams of radio signals are received from the same respective wireless communication node, the apparatus, such as the processing circuitry, is configured to identify the respective wireless communication node as a beamforming node.

The apparatus 20, such as the processing circuitry 22, the communication interface 26 or the like, of an example embodiment may be configured to identify that two or more beams of radio signals that are received at different times from the same respective wireless communication node are different in an instance in which the measures of the different beams of radio signals vary by more than a predefined amount or by more than a predefined percentage. Thus, the apparatus, such as the processing circuitry, the communication interface or the like, of this example embodiment is configured to accommodate a small deviation in the beams of radio signals received from a respective wireless communication node at different points in time without identifying the respective wireless communication node as a beamforming node. Instead, the apparatus, such as the processing circuitry, the communication interface or the like, of this example embodiment is only configured to identify the respective wireless communication node as a beamforming node in an instance in which the beams of radio signals received from the respective wireless communication node at different points in time are more substantially different, such as by differing by more than the predefined amount or the predefined percentage. In other embodiments, however, the apparatus, such as the processing circuitry, the communication interface or the like, may be configured such that any difference in the beams of radio signals received from a respective wireless communication node at different points in time may cause the respective wireless communication node to be identified as a beamforming node.

Figure 5A:
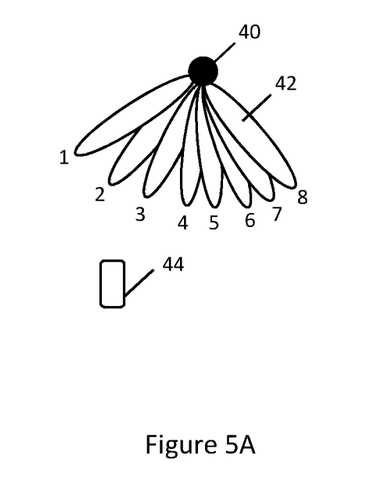
FIG. 5A illustrates eight different beams of radio signals that are sequentially transmitted at different points in time by a beamforming node.

By way of example, FIG. 5A depicts a wireless communication node 40 having a phased array of antennas for transmitting and receiving radio signals. The radio beams 42 sequentially generated by the wireless communication node at eight different points in time are illustrated and designated 1, 2, . . . 8. In FIG. 5A, all eight beams are depicted in a composite view. However, the wireless communication node will only transmit one of the beams at any one point in time with the wireless communication node sweeping the beam by sequentially advancing from transmission of one beam to the next until of the beams have been transmitted in a relatively short period of time while the position of the wireless communication node remains the same or virtually the same. As shown, the wireless communication node sweeps the beam such that the beam of radio signals generated at each different point in time is different from the beams of radio signals generated at other points in time, at least in terms of the direction and corresponding coverage area of the beams of radio signals.

Figure 5B:
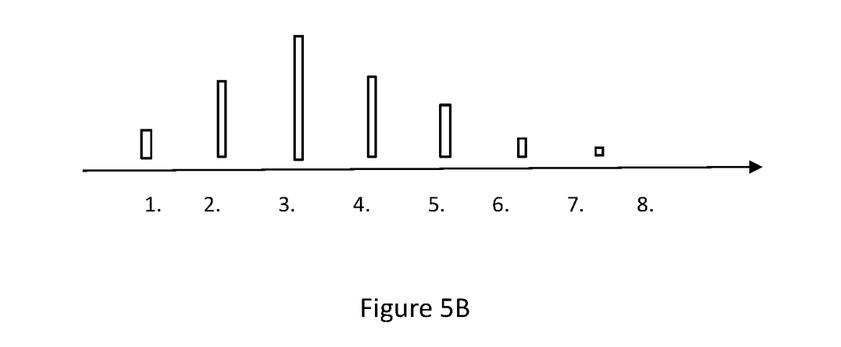
FIG. 5B is a graphical representation of the signal strength of the radio signals that are received and measured by a mobile device located relative to the beamforming node as shown in FIG. 5A as the different beams are sequentially transmitted by the beamforming node as indicated along the horizontal axis of FIG. 5B.

For a mobile device 44 positioned relative to the wireless communication node 40 as shown in FIG. 5A, the signal strength of the radio signals transmitted by the wireless communication node and received by the mobile node at each of the eight different sequential points in time when the eight different beams of radio signals are transmitted by the wireless communication node are graphically depicted in FIG. 5B. With respect to a beamforming node, the radio signals received by the mobile node not only identify the wireless communication node, but may also identify the antenna configuration that is currently active such that the different beams may be distinguished. As shown in FIG. 5B, the signal strength from the third beam of radio signals is greater than the signal strengths of any of the other beams of radio signals generated by the same wireless communication node since the position of the mobile device is more closely aligned with the third beam of radio signals as shown in FIG. 5A. Since the plurality of different beams of radio signals generated by the wireless communication node and received by the mobile device at different points in time are different from one another, the apparatus 20, such as the processing circuitry 22, of an example embodiment is configured to identify the wireless communication node as a beamforming node.

As noted above, the apparatus 20, such as the processing circuitry 22, the communication interface 26 or the like, may be configured to identify a wireless communication node as a beamforming node in various manners. In another embodiment, such as in which the apparatus is embodied by the positioning system or by another network entity, the apparatus includes means, such as the processing circuitry, the communication interface or the like, for identifying a particular wireless communication node as a beamforming node by receiving an indication, such as a flag or other indicia, that the particular communication node was identified to be a beamforming node. In this example embodiment, a mobile device or a network entity may have identified the particular wireless communication node as a beamforming node, such as in the manner described above in relation to FIGS. 5A and 5B, and the apparatus, such as the processing circuitry, the communication interface or the like, may be configured to receive information regarding the particular wireless communication node including the indication that the particular wireless communication node has been identified to be a beamforming node. Based on the indication, the apparatus, such as the processing circuitry, thereafter processes the signals provided by the particular wireless communication node as the signals generated by a beamforming node.

Referring now to block 32 of FIG. 4, the apparatus 20 also includes means, such as the processing circuitry 22, the communication interface 26 or the like, for restricting use of the particular communication node that has been identified as a beamforming node for positioning purposes relative to another one of the wireless communication nodes that has not been identified as a beamforming node. As described below, positioning purposes may include the creation or updating of a radio map, such as based upon radio fingerprints, and/or the determination of the position of a mobile device utilizing a radio map.

In an instance in which the particular wireless communication node has been identified as a beamforming node, the use of the particular wireless communication node for positioning purposes may be restricted, such as by being blacklisted, in various manners. In one example embodiment, information regarding the particular wireless communication node and the radio signals transmitted by the particular wireless communication node may still be provided to the positioning system, albeit with an indication that the particular wireless communication node is a beamforming node. In this example embodiment in which the apparatus 20 is embodied by a mobile device or a network entity in communication, either directly or indirectly, with the positioning system, the apparatus, such as the processing circuitry 22, the communication interface 26 or the like, is configured to cause an indication, such as a flag, to be transmitted to the positioning system regarding the particular wireless communication node being a beamforming node. By providing an indication of the beamforming node, the positioning system can utilize any information regarding the radio signals generated by the beamforming node so as to take into account the additional uncertainty that is associated with the radio signals of a beamforming node, if the information is utilized at all.

In this example embodiment, the apparatus 20, such as the processing circuitry 22, the communication interface 26 or the like, may also be configured to cause information regarding the particular wireless communication node to be transmitted to the positioning system. The information that is also transmitted to the positioning system regarding the particular wireless communication node may include information that identifies the particular wireless communication node and information regarding the signal strength and/or path loss estimate of the radio signals received by the mobile device from the particular wireless communication node and timing measurements, such as the Timing Advance and/or Round-Trip Time measurements, for the signals received from the particular wireless communication node. In an embodiment in which the information regarding the particular wireless communication node is provided in conjunction with the creation or updating of a radio map, the information that is provided may also include information regarding the location of the mobile device at the time at which the radio signals transmitted by the particular wireless communication node are received. In this regard, the mobile device may include a Global Positioning System (GPS) sensor or other location sensor for determining the location of the mobile device.

In an alternative embodiment in which the apparatus 20 is embodied by a mobile device or by a network entity that is in communication, either directly or indirectly, with the positioning system, the apparatus 20, such as the processing circuitry 22, the communication interface 26 or the like, may be configured to restrict the use of a particular wireless communication node for positioning purposes by not even providing information regarding the particular wireless communication node that has been identified to be a beamforming node to the positioning system such that the positioning system may be unaware of the particular wireless communication node during the creation or updating of a radio map and/or during the determination of the location of a mobile device. In this example embodiment, the apparatus, such as the processing circuitry, the communication interface or the like, is configured to restrict the use of the particular wireless communication node for positioning purposes by being configured, prior to causing fingerprint information to be provided to the positioning system, (i) to exclude information regarding the particular wireless communication node from the fingerprint information based on the particular wireless communication node having been identified as a beamforming node and (ii) to include information regarding another one of the wireless communication nodes that has not been identified as a beamforming node. In this example embodiment, the apparatus also includes means, such as the processing circuitry, the communication interface or the like, for providing the information regarding the another one of the wireless communication node that has not been identified as a beamforming node to the positioning system, albeit without providing information regarding the particular wireless communication node that has been identified as a beamforming node.

The fingerprint information that is provided to the positioning system in accordance with this example embodiment therefore only includes the information regarding the one or more wireless communication nodes that have not been identified as a beamforming node and does not include information regarding any wireless communication node that has been identified as a beamforming node. Thus, the positioning system of this example embodiment cannot rely upon information regarding a beamforming node, which may otherwise cause the accuracy of a radio map or the determined location of a mobile device to be diminished.

The apparatus 20 of an example embodiment may be configured to restrict the use of the particular wireless communication node that has been identified as a beamforming node for various types of positioning purposes including the generation and/or updating of a radio map that is subsequently utilized for position determination purposes and/or the determination of a position of a mobile device, such as based upon a radio map. In relation to the updating of a radio map, an existing radio map may be updated to include newly added wireless communication nodes and/or to indicate that the mode of operation of a previously identified wireless communication node has changed, such as from a wireless communication node that is not beamforming to a wireless communication node that now is a beamforming node. In an example embodiment, the apparatus, such as the processing circuitry 22, the communication interface 26 or the like, is configured to restrict the use of a particular wireless communication node that has been identified to be a beamforming node for positioning purposes by generating or updating a radio map without reliance upon the particular wireless communication node that was identified to be a beamforming node. In this example embodiment, the apparatus may be embodied by a computing device of the positioning system or by another network entity that generates or updates a radio map.

In this example embodiment, a radio map may be created or updated without reliance on the particular wireless communication node that was identified to be a beamforming node in an instance in which the information regarding the particular wireless communication node that was identified to be a beamforming node was not provided to the positioning system or other network entity that is configured to generate or update the radio map, such as in an instance in which information regarding the beamforming node is excluded from the information regarding wireless communication nodes that is provided by a mobile device. Indeed, without having received the information regarding the particular wireless communication node that was identified to be a beamforming node, any radio map that has generated or updated necessarily fails to rely upon the particular wireless communication node identified as a beamforming node.

Alternatively, in an embodiment in which information regarding the particular wireless communication node that was identified as a beamforming node is provided to the positioning system or other network entity that is configured to generate or update a radio map, the information regarding the particular wireless communication node that was identified to be a beamforming node may be excluded during generation or updating of the radio map. In this regard, the information regarding the particular wireless communication node that was identified to be a beamforming node may be identified based upon an indication, such as a flag, provided in combination with the information regarding the particular wireless communication node that was identified to be a beamforming node. Thus, the information regarding the beamforming node may be distinguished from information provided regarding other wireless communication nodes that are not identified to be a beamforming node and which can therefore be relied upon for generation or updating of the radio map.

In addition to or as an alternative to restricting the use of information relating to a beamforming node in conjunction with the creation or updating of a radio map, the apparatus 20, such as the processing circuitry 22, the communication interface 26 or the like, may be configured to restrict the use of the particular wireless communication node that has been identified as a beamforming node for positioning purposes during the subsequent determination of a position of a mobile device. In this regard, the mobile device may be configured to capture fingerprint information from which a positioning system may be configured to determine the location of the mobile device utilizing, for example, a radio map. In accordance with this example embodiment, however, the apparatus, such as the processing circuitry, the communication interface or the like, is configured to restrict the use of the particular wireless communication node that has been identified as a beamforming node for positioning purposes by determining the position of the mobile device without reliance upon the particular wireless communication node that has been identified to a beamforming node. As a radio map may be stored and utilized by a mobile device, the positioning system or by another network entity, the apparatus of this example embodiment may correspondingly be embodied by the mobile device, by a computing device of the positioning system or by another network entity.

In this example embodiment in which the apparatus 20 is embodied by a computing device of the positioning system or by another network entity, the position of the mobile device may be determined without reliance on the particular wireless communication node that was identified to be a beamforming node in an instance in which the information regarding the particular wireless communication node that was identified to be a beamforming node was not provided to the positioning system or other network entity that is configured to determine the position of the mobile device, such as in an instance in which information regarding the beamforming node is excluded from the information regarding wireless communication nodes that is provided by a mobile device. Indeed, without having received the information regarding the particular wireless communication node that was identified to be a beamforming node, the determination of the position of the mobile device necessarily fails to rely upon the particular wireless communication node identified as a beamforming node.

Alternatively, the apparatus 20 may have access to the information regarding the particular wireless communication node that was identified as a beamforming node, such as in an embodiment in which the apparatus is embodied by the mobile device or in which the apparatus is embodied by a computing device of the positioning system or another network entity and information regarding the beamforming node is provided to the positioning system or other network entity. Even though the apparatus of this example embodiment has access to the information regarding the particular wireless communication node that was identified as a beamforming node, the information regarding the particular wireless communication node that was identified to be a beamforming node may be excluded during the determination of the position of the mobile device. In this regard, the information regarding the particular wireless communication node that was identified to be a beamforming node may be identified based upon an indication, such as a flag, provided in combination with the information regarding the particular wireless communication node that was identified to be a beamforming node. Thus, the information regarding the beamforming node may be distinguished from information provided regarding other wireless communication nodes that are not identified to be a beamforming node and which can therefore be relied upon for determination of the position of the mobile device.

With respect to some positioning techniques, such as coverage model-based positioning techniques, the variation in the beams of radio signals transmitted by a beamforming node may be less harmful than in other types of positioning techniques, such as positioning techniques that rely, not on coverage, but on the signal strength at different positions. In this regard, a coverage model-based positioning technique identifies the wireless communication nodes, if any, from which a mobile device is able to receive signals at a respective location without an indication as to the signal strength of the radio signals received from the different wireless communication nodes.

In an example embodiment that employs a coverage-model based positioning technique, the apparatus 20, such as the processing circuitry 22, the communication interface 26 or the like, may be configured to utilize the information regarding a particular wireless communication node that has been identified as a beamforming node, but to do so in a different manner than or at least with a preference for information regarding the wireless communication nodes that have not been identified as beamforming node and which, instead, have a stable or static coverage model, that is, a beam of radio signals that does not vary, at least not appreciably, over time. In this example embodiment, the apparatus, such as the processing circuitry, the communication interface or the like, is configured to restrict the use of a particular wireless communication node that has been identified as a beamforming node for positioning purposes by relying upon the particular wireless communication node that has been identified as a beamforming node for positioning purposes to a lesser degree than other wireless communication node(s) that have not been identified as a beamforming node, such as other wireless communication nodes having a stable or static coverage model.

In one example embodiment, the apparatus 20, such as the processing circuitry 22, the communication interface 26 or the like, is configured to construct or update a coverage map utilized in conjunction with a coverage model-based positioning technique by differently weighting the contribution of the particular wireless communication node that has been identified as a beamforming node for positioning purposes than the contribution(s) of other wireless communication node(s) that have not been identified as a beamforming node. For example, the contribution of the particular wireless communication node that has been identified as a beamforming node may be weighted to a lesser degree so as to have a lower priority than the contribution(s) of other wireless communication node(s) that have not been identified as a beamforming node in relation to the construction or update of the coverage map. Thereafter, the position of a mobile device that receives radio signals both from a beamforming node and from one or more other wireless communication nodes that have not been identified to be a beamforming node may be determined in this example embodiment based upon a coverage map and in reliance upon having received radio signals from all of the wireless communication nodes including the beamforming node, but the reliance upon the beamforming node may be to a lesser degree than the reliance upon the other wireless communication nodes that have not been identified as a beamforming node, such as due to the reduced weighting of the beamforming node.

The apparatus 20, such as the processing circuitry 22, may be configured to assign a weight to the contribution of the particular wireless communication node that has been identified as a beamforming node in various manners. For example, the weight may be a predefined value. Alternatively, the weight may be dependent upon the other wireless communication nodes with which a mobile device is able to communicate at a particular position. In this regard, the weight assigned to the contribution of the particular wireless communication node that has been identified as a beamforming node may have an inverse relationship to the number of other wireless communication nodes with which a mobile device is able to communicate at a particular position. Thus, a lower weight may be assigned to the contribution of the particular wireless communication node that has been identified as a beamforming node in an instance in which a mobile device is able to communicate with a greater number of other wireless communication nodes at a particular location than in an instance in which the mobile device is able to communicate with fewer of the other wireless communication nodes that have not been identified as a beamforming node. Conversely, a greater weight may be assigned to the contribution of the particular wireless communication node that has been identified as a beamforming node in an instance in which a mobile device is able to communicate with a smaller number of other wireless communication nodes at a particular location than in an instance in which the mobile device is able to communicate with a larger number of the other wireless communication nodes that have not been identified as a beamforming node.

The apparatus 20, such as the processing circuitry 22, of an example embodiment may be configured to determine the positioning technique to be utilized based upon whether one or more of the wireless communication nodes is identified to be a beamforming node. For example, in an instance in which none of the wireless communication nodes are identified to be a beamforming node or in which radio signals are received from at least a predefined number of wireless communication nodes that are not identified to be beamforming nodes (regardless of whether one or more other wireless communication nodes are identified to be beamforming nodes), the apparatus, such as the processing circuitry, may be configured to utilize a positioning technique for determining the location of a mobile device that utilizes radio maps dependent upon the signal strength of the radio signals received from the wireless communication devices. Otherwise, such as in an instance in which at least one wireless communication node is identified to be a beamforming node, the apparatus, such as the processing circuitry, may be configured to utilize a coverage model-based positioning technique for determining the location of a mobile device.

As described above, a method, apparatus 20 and computer program product are provided in accordance with an example embodiment in order to identify a beamforming node and to restrict the use of the beamforming node for positioning purposes relative to one or more other wireless communication nodes that are not identified as a beamforming node. As such, the method, apparatus and computer program product of an example embodiment can increase the accuracy and/or confidence with which a radio model is generated or updated and/or the position of mobile device is determined by identifying and restricting the use of a beamforming node for positioning purposes since the information regarding the radio signals transmitted by the beamforming node is more variable and less consistent than the information regarding the radio signals transmitted by other wireless communication nodes that are not beamforming nodes.

FIG. 4 illustrates a flowchart depicting a method according to an example embodiment of the present invention. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 24 of an apparatus 20 employing an embodiment of the present invention and executed by the processing circuitry 22. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising processing circuitry and at least one non-transitory memory including computer program code instructions, the computer program code instructions configured to, when executed, cause the apparatus to at least:
   identify a particular wireless communication node of one or more wireless communication nodes as a beamforming node; and
   restrict use of the particular wireless communication node for positioning purposes relative to another one of the wireless communication nodes that has not been identified as a beamforming node by constructing or updating a coverage model so as to rely upon the particular wireless communication node for positioning purposes to a lesser degree than the another one of the wireless communication nodes that has not been identified as a beamforming node.

2. The apparatus according to claim 1, wherein the computer program code instructions configured to restrict use of the particular wireless communication node for positioning purposes comprise computer program code instructions configured to cause an indication to be transmitted to a positioning system regarding the particular wireless communication node being a beamforming node.

3. The apparatus according to claim 2, wherein the computer program code instructions configured to cause the indication to be transmitted to the positioning system comprise computer program code instructions configured to cause information regarding the particular wireless communication node to be transmitted to the positioning system.

4. The apparatus according to claim 1, wherein the computer program code instructions configured to restrict use of the particular wireless communication node for positioning purposes comprise computer program code instructions configured, prior to causing fingerprint information to be provided to a positioning system, (i) to exclude information regarding the particular wireless communication node from the fingerprint information based on the particular wireless communication node having been identified as a beamforming node, and (ii) to include information regarding another one of the wireless communication nodes that has not been identified as a beamforming node, and wherein the computer program code instructions are further configured to, when executed, cause the apparatus to provide the information regarding the another one of the wireless communication nodes that has not been identified as a beamforming node to the positioning system.

5. The apparatus according to claim 1, wherein the computer program code instructions configured to identify the particular wireless communication node as a beamforming node comprise computer program code instructions configured to:
   determine a measure of signals received from the one or more wireless communication nodes; and
   identify, from the measure of the signals received from the one or more wireless communication nodes, that two or more different beams are received from the particular wireless communication nodes that is identified as a beamforming node.

6. The apparatus according to claim 1, wherein the computer program code instructions configured to identify the particular wireless communication node as a beamforming node comprises computer program code instructions configured to receive an indication that the particular wireless communication node was identified to be a beamforming node.

7. The apparatus according to claim 1, wherein the computer program code instructions configured to restrict use of the particular wireless communication node for positioning purposes comprise computer program code instructions configured to generate or update a radio map without reliance upon the particular wireless communication node that was identified to be a beamforming node.

8. The apparatus according to claim 1, wherein the computer program code instructions configured to restrict use of the particular wireless communication node for positioning purposes comprise computer program code instructions configured to determine a position of a mobile device without reliance upon the particular wireless communication node that was identified to be a beamforming node.

9. The apparatus according to claim 1, wherein the computer program code instructions configured to construct or update the coverage model comprise computer program code instructions configured to differently weight a contribution of the particular wireless communication node for positioning purposes than a contribution by the another one of the wireless communication nodes that has not been identified as a beamforming node.

10. The apparatus according to claim 9, wherein the weight is dependent upon other wireless communication nodes with which a mobile device is able to communicate at a particular position.

11. The apparatus according to claim 10, wherein the weight assigned to the contribution of the particular wireless communication node that has been identified as a beamforming node has an inverse relationship to a number of the other wireless communication nodes with which the mobile device is able to communicate at the particular position.

12. A method comprising:
identifying a particular wireless communication node of one or more wireless communication nodes as a beamforming node; and
restricting use of the particular wireless communication node for positioning purposes relative to another one of the wireless communication nodes that has not been identified as a beamforming node by generating or updating a radio map without reliance upon the particular wireless communication node that was identified to be a beamforming node.

13. The method according to claim 12, wherein restricting use of the particular wireless communication node for positioning purposes comprises causing an indication to be transmitted to a positioning system regarding the particular wireless communication node being a beamforming node.

14. The method according to claim 13, wherein restricting use of the particular wireless communication node for positioning purposes further comprises causing information regarding the particular wireless communication node to be transmitted to the positioning system.

15. The method according to claim 12, wherein restricting use of the particular wireless communication node for positioning purposes comprises, prior to causing fingerprint information to be provided to a positioning system, (i) excluding information regarding the particular wireless communication node from the fingerprint information based on the particular wireless communication node having been identified as a beamforming node, and (ii) including information regarding another one of the wireless communication nodes that has not been identified as a beamforming node, and wherein the method further comprises providing the information regarding the another one of the wireless communication nodes that has not been identified as a beamforming node to the positioning system.

16. The method according to claim 12, wherein identifying the particular wireless communication node as a beamforming node comprises:
determining a measure of signals received from the one or more wireless communication nodes; and
identifying, from the measure of the signals received from the one or more wireless communication nodes, that two or more different beams are received from the particular wireless communication nodes that is identified as a beamforming node.

17. The method according to claim 12, wherein identifying the particular wireless communication node as a beamforming node comprises receiving an indication that the particular wireless communication node was identified to be a beamforming node.

18. The method according to claim 12, wherein restricting use of the particular wireless communication node for positioning purposes comprises determining a position of a mobile device without reliance upon the particular wireless communication node that was identified to be a beamforming node.

19. A computer program product comprising a non-transitory computer readable medium having program code portions stored thereon, the program code portions being configured, upon execution, to at least:
identify a particular wireless communication node of one or more wireless communication nodes as a beamforming node; and
restrict use of the particular wireless communication node for positioning purposes relative to another one of the wireless communication nodes that has not been identified as a beamforming node wherein the program code portions configured to restrict use of the particular wireless communication node comprise program code portions configured to include but to differently weight a contribution of the particular wireless communication node for positioning purposes than a contribution by the another one of the wireless communication nodes that has not been identified as a beamforming node.

20. The computer program product according to claim 19, wherein the weight assigned to a contribution of the particular wireless communication node that has been identified as a beamforming node has an inverse relationship to a number of other wireless communication nodes with which the mobile device is able to communicate at the particular position.

* * * * *

UNITED STATES PATENT AND TRADEMARK OFFICE
CERTIFICATE OF CORRECTION

PATENT NO. : 11,553,448 B2
APPLICATION NO. : 17/116798
DATED : January 10, 2023
INVENTOR(S) : Marko Luomi et al.

Page 1 of 1

It is certified that error appears in the above-identified patent and that said Letters Patent is hereby corrected as shown below:

In the Claims

In Column 22, Line 46, Claim 19, delete "node" and insert -- node, --, therefor.

Signed and Sealed this
Seventeenth Day of October, 2023

Katherine Kelly Vidal
*Director of the United States Patent and Trademark Office*